United States Patent [19]

Neier

[11] Patent Number: 5,732,892

[45] Date of Patent: Mar. 31, 1998

[54] SELF-LOADING AUGER

[75] Inventor: Benjamin R. Neier, Dodge City, Kans.

[73] Assignee: J-Star Industries, Inc., Fort Atkinson, Wis.

[21] Appl. No.: 698,025

[22] Filed: Aug. 15, 1996

[51] Int. Cl.⁶ .................................................. B02C 19/22
[52] U.S. Cl. ........................ 241/30; 241/101.8; 241/260.1
[58] Field of Search ............................. 241/30, 101.8, 241/101.742, 260.1, 101.763, 101.77; 366/603

[56] References Cited

U.S. PATENT DOCUMENTS

| 5,356,054 | 10/1994 | Loppoli et al. | 241/260.1 |
| 5,402,950 | 4/1995 | Blair et al. | 241/260.1 |
| 5,443,588 | 8/1995 | Loppoli . | |
| 5,601,239 | 2/1997 | Smith et al. | 241/260.1 |

FOREIGN PATENT DOCUMENTS

| 0474538 | 3/1992 | European Pat. Off. | 241/260.1 |
| 3704713 | 7/1988 | Germany | 241/260.1 |

Primary Examiner—Mark Rosenbaum
Attorney, Agent, or Firm—Zarley, McKee, Thomte, Voorhees, & Sease

[57] ABSTRACT

A self-loading auger for a material mixer includes a shaft having two sections of flighting extending from each end towards the center of the shaft. Mounted along the flighting sections are a plurality of knife blades disposed perpendicular to the axis of the shaft so that as the shaft rotates and the flighting pushes material towards the center of the auger, the knife blades will cut the material along a straight line. Additional knife blades are mounted near the center of the auger between the points where the two flighting sections end.

19 Claims, 3 Drawing Sheets

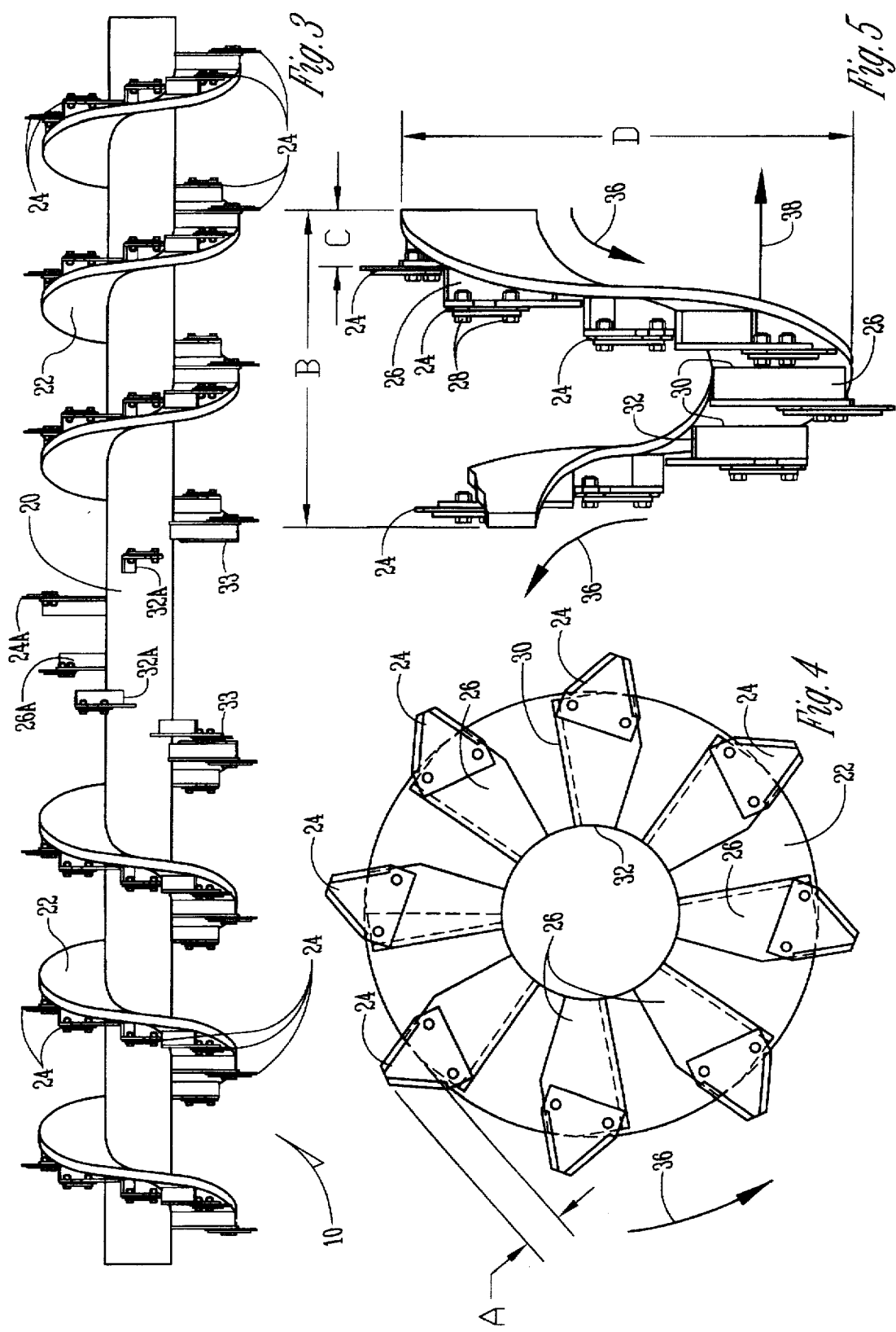

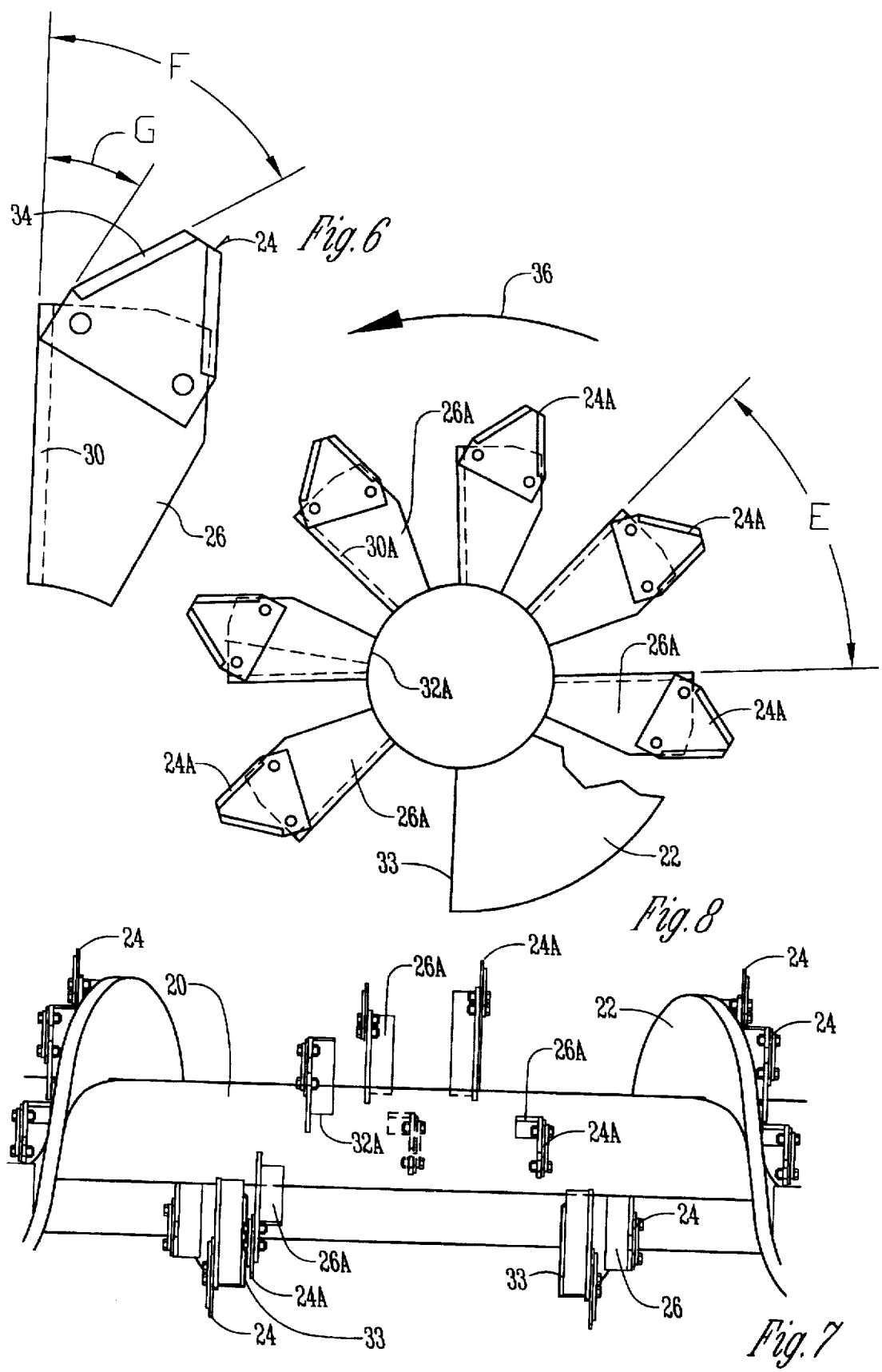

SELF-LOADING AUGER

BACKGROUND OF THE INVENTION

The present invention relates to feed mixers. More particularly, the present invention relates to a self-loading auger for use with a feed mixer.

Feed mixers are known in the art. In the cattle and dairy farming industries, for example, it is common for farmers to mix and distribute large quantities of hay, silage and grain to feeding troughs. Some prior art feed mixers are towed by tractors while others are self-propelled. A typical self-propelled feed mixer is comprised of a self-propelled chassis with a feed mixer mounted on the chassis. A self-loading auger may also be installed on the feed mixer to load the feed into the mixer. The auger is used to move material toward an elevator in order to load the material into the mixer.

A prior art auger includes two sections of flighting, each configured to push material to the center of the auger near the elevator when the auger shaft is rotated. A number of knives are bolted to the flighting sections and are intended to cut up certain materials before they are loaded into the mixer.

Prior art self-loading augers with knife blades as described above work fine on grain, silage, and ground hay but do not work well on bailed hay. This problem is caused by the orientation of the knife blades. Prior art knife blades are mounted to the flighting which at every point along the flighting is at an angle with respect to the axis of the auger shaft. As a result, the knife blades move at an angle as they travel around the auger shaft. This results in poor cutting because the knives are shaving rather than cutting.

It is therefore a general object of the present invention to provide an improved self-loading auger.

A further object of the present invention is the provision of a self-loading auger used to load a self-propelled feed mixer.

A further object of the present invention is the provision of a self-loading auger having flighting with a number of blades positioned perpendicular to the axis of the auger.

A further object of the present invention is the provision of a self-loading auger having blades positioned perpendicular to the axis of the auger and positioned behind the flighting of the auger.

A further object of the present invention is the provision of a self-loading auger having knife blades positioned around the auger that cut straight as the auger rotates.

A further object of the present invention is the provision of an auger for use with a feed mixture with a hay processor attachment.

These as well as other objects of the present invention will become apparent from the following specification and claims.

SUMMARY OF THE INVENTION

A self-loading auger of the present invention is used with a material mixer to cut and load the material into the mixing tank. The self-loading auger includes a rotatable shaft including a flighting section disposed around a shaft to push material towards the center of the shaft. A plurality of knife blades are mounted to the auger and oriented perpendicular to the axis of the shaft in order to efficiently cut material to be loaded into the material mixer.

BRIEF DESCRIPTION OF THE DRAWINGS

FIG. 3 is an enlarged view of the auger shown in FIG. 1.

FIG. 4 is an enlarged side view of the auger shown in FIG. 3.

FIG. 5 shows a portion of the flighting and blades of the present invention.

FIG. 6 shows an enlarged view of a blade and mounting bracket of the present invention.

FIG. 7 is a view taken from line 7—7 of FIG. 1.

FIG. 8 is an enlarged side view of the blades shown in FIG. 7.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
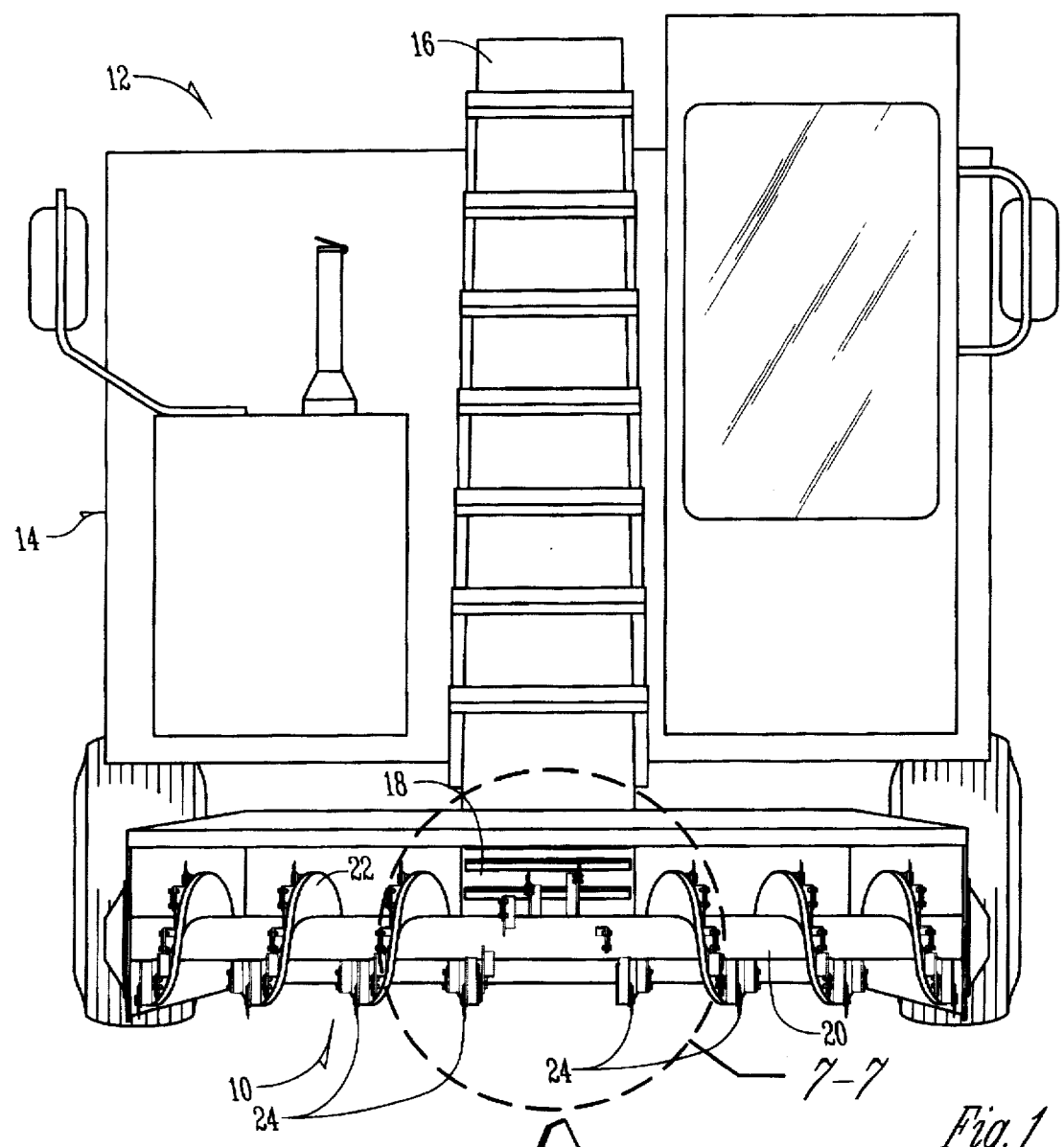
FIG. 1 shows a self-propelled feed mixer with the self-loading auger of the present invention.
Figure 2:
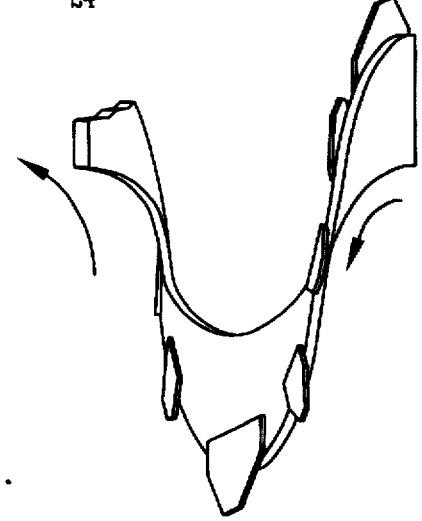
FIG. 2 shows a portion of the flighting of a prior art auger.

FIG. 1 shows a self-loading auger 10 used with a self-propelled material mixer 12. The self-propelled material mixer 12 includes a mixing tank 14 and an elevator 16. The elevator 16 includes a track 18 which moves upward in order to move material from the bottom of the elevator to the top of the elevator 16 in order to load the material into the tank 14. The auger 10 rotates about a shaft 20 to move material toward the center of the auger 10 and the bottom of the elevator 16.

FIG. 3 is an enlarged view of the auger 10 shown in FIG. 1. Two sections of flighting 22 are disposed around the shaft 20 in a spiral-like orientation. As the shaft 20 is rotated, the flighting will push material towards the center of the auger 10. A plurality of knife blades 24 are coupled to the shaft 20 and flighting sections 22 as shown in FIGS. 3–8. The knife blades 24 are mounted to the auger 10 perpendicular to the axis of the auger.

As shown in FIGS. 4 and 5, the knife blades 24 are each secured by a pair of bolts 28 to an elongated mounting bracket 26 having an L-shaped cross-section. The mounting brackets 26 have a first edge 30 which is welded to the flighting 22. The mounting brackets 26 have a second edge 32 which is welded to the shaft 20. With the edges 30 and 32 welded to the flighting 22 and shaft 20, the mounting brackets 26 and blades 24 are securely coupled to the auger 10. As shown in FIG. 4, the blades 24 extend past the flighting 22 a distance A which is preferably 1.555 inches.

The blades 24 are bolted to the mounting brackets 26 in the orientation shown in FIG. 6. The blade is disposed at an angle G from the first edge 30 of the mounting bracket 26. The forward edge 34 of the blade 24 is then at an angle F from the first edge 30. Preferably, the angles G and F are 30° and 60°, respectively.

As shown in FIGS. 1 and 3, the flighting sections 22 do not extend to the center of the shaft 20. The mounting brackets 26 and blades 24 are mounted to the shaft 20 even past where the flighting sections 22 end. FIG. 7 is an enlarged view of the auger 10 shown in FIGS. 1 and 3. As shown in FIG. 7, a plurality of knife blades 24A are each mounted to mounting brackets 26A. The mounting brackets 26A each include an edge 32A which is welded to the shaft 20. In this way, even after the point where the flighting ends, there are still knife blades 24A disposed around the shaft 20. FIG. 8 shows a side view of FIG. 7 similar to FIG. 4 and shows the knife blades 24A. The knife blades 24A are oriented in the same way as the blades 24 shown in FIG. 4.

Arrows 36 in FIGS. 4, 5, and 8 show the direction of rotation of the auger 10. In this direction of rotation, the material will flow towards the center of the auger 10. In FIG. 5, the material flows to the right as shown by arrow 38.

Although the dimensions of the self-loading auger 10 can vary, the preferred dimensions are as follows. As shown in FIG. 5, the flighting 22 has a pitch shown as dimension B. The distance between the flighting 22 and each knife blade 24 is shown as dimension C. The diameter of the flighting is shown as dimension D. The preferred values for dimensions B, C, and D are 12 inches, 2 inches, and 17 inches, respectively. As shown in FIG. 8, the knife blades 24 and 24A are separated from each other by a number of degrees E, preferably 45°. At 45°, there are eight blades 24 for every turn of the auger 10.

The blades 24 are mounted to the auger 10 behind the flighting sections 22 as shown best in FIGS. 3 and 5. This prevents the mounting brackets 26 and blades 24 from interfering with the material flow as it is pushed to the center of the auger 10 by the flighting 22.

The present invention operates as follows. A typical use for a self-propelled material mixer 12 having the self-loading auger 10 of the present invention is to load feed such as loose hay or bales of hay into the tank 14 of the material mixer 12.

With the shaft 20 rotating in the direction shown by arrows 36, the operator of the self-propelled material mixer 12 can move the mixer 12 towards the material to be loaded, for example, a bale of hay. The blades 24 will cut the material while the flighting sections 22 push the material toward the center of the auger 10 where it will catch on the track 18 of the elevator 16. The elevator raises the material along the elevator to load the material into the tank 14.

When the self-propelled material mixer 12 encounters material such as a bale of hay, the blades 24 will cut the bale in a straight line. Since the blades 24 and 24A are perpendicular to the axis of the shaft 20 rather than at the same angle as the flighting, the blades will cut the material effectively. When the hay or other material is pushed toward the center of the auger 10 past the flighting sections 22, the blades 24A will continue to cut the material.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A self-loading auger used for moving material comprising:
   a rotatable shaft;
   a flighting coupled to said rotatable shaft, said flighting being disposed around said rotatable shaft in a spiral configuration to move the material when said rotatable shaft rotates, wherein said flighting having a front side which, when the shaft and flighting is rotated, is the side which moves the material; and
   a plurality of blades operatively coupled to and rotatable with said rotatable shaft for cutting the material, said blades being oriented substantially perpendicular to the length of the shaft and being disposed proximate the flighting on the side opposite the front side such that the blades do not substantially interfere with the movement of the material.

2. The self-loading auger of claim 1 further comprising a plurality of mounting brackets for coupling the plurality of blades to the rotatable shaft.

3. The self-loading auger of claim 2 wherein each of said mounting brackets are mounted to both the rotatable shaft and the flighting.

4. The self-loading auger of claim 2 wherein said mounting brackets are welded to said rotatable shaft.

5. The self-loading auger of claim 2 wherein each of said mounting brackets is formed of an elongated member having an L-shaped cross-section.

6. The self-loading auger of claim 5 wherein each of said mounting brackets is fastened to the rotatable shaft at one end and fastened to the flighting along one side of the mounting bracket.

7. The self-loading auger of claim 2 wherein said plurality of blades are bolted to said mounting brackets.

8. A self-propelled material mixer comprising:
   a material mixer mounted to a chassis;
   an elevator coupled to said material mixer for loading material into said material mixer; and
   a self-loading auger mounted to said material mixer for cutting material to be loaded and moving the material toward said elevator, said self-loading auger further comprising:
   a rotatable shaft,
   a flighting assembly coupled to said shaft, said flighting assembly being disposed around said shaft in a spiral configuration to move the material toward said elevator when said shaft rotates, said flighting assembly having a forward side which pushes the material to be moved and a trailing side which is opposite the forward side, and
   a plurality of blades operatively coupled to and rotatable with said rotatable shaft for cutting the material to be mixed, said blades being disposed perpendicular to the axis of the shaft and on the trailing side of the flighting.

9. The self-propelled material mixer of claim 8 wherein said plurality of blades are disposed parallel to a plane, said plane being perpendicular to the shaft such that the blades cut in a path which is parallel to the plane.

10. The self-propelled material mixer of claim 8 further comprising a plurality of mounting brackets coupled to at least some of the plurality of blades for mounting at least some of the plurality of blades to the self-loading auger.

11. The self-propelled material mixer of claim 10 wherein said mounting brackets are coupled to the flighting assembly.

12. The self-propelled material mixer of claim 10 wherein said mounting brackets are coupled to the rotatable shaft.

13. The self-propelled material mixer of claim 10 wherein said mounting brackets each include a first and second member disposed perpendicular to each other.

14. The self-propelled material mixer of claim 13 wherein said mounting brackets are elongated and have an L-shaped cross-section.

15. The self-propelled material mixer of claim 9 wherein said plurality of blades and said flighting assembly both extend outward from said rotatable shaft, and wherein said plurality of blades extend farther outward than the flighting assembly.

16. A method of loading material into a material mixer comprising the steps of:
   providing a rotatable auger having a spiral flighting coupled to the material mixer;
   providing a plurality of blades coupled substantially perpendicular to the auger for cutting the material to be loaded;

bringing said material into proximity with the auger;

rotating the auger to move the material along the auger;

cutting at least some of the material behind the spiral flighting with a cutting motion substantially perpendicular to the axis of the rotating auger; and loading the material into the material mixer.

17. An auger for use in loading material comprising:

an elongated auger shaft having a longitudinal axis;

a helical flighting attached to said shaft and extending around said shaft and along at least a portion of the length of said shaft for rotating with said shaft to engage and move said material during rotation of said shaft about said longitudinal axis, said helical flighting having a first and second side, wherein the first side engages and moves said material;

a plurality of blades;

a plurality of mounting brackets disposed on said second side of said helical flighting, at least a first portion of said mounting brackets coupling at least a first portion of said blades to said flighting for rotation in unison therewith during rotation of said shaft to cut the material without substantially interfering with the movement of the material.

18. An auger according to claim 17 wherein said blades are flat and said first portions of said brackets hold said blades in an orientation substantially perpendicular to said longitudinal axis of said shaft.

19. An auger according to claim 18 wherein a second portion of said brackets couple at least a second portion of said blades to said shaft.

* * * * *